Dec. 7, 1943.  J. MARTIN  2,335,952
CABLE CUTTING DEVICE FOR USE ON AIRCRAFT
Filed March 23, 1942   3 Sheets-Sheet 1

Inventor.
JAMES MARTIN.
per.
Raynerto
Attorneys.

Dec. 7, 1943.  J. MARTIN  2,335,952
CABLE CUTTING DEVICE FOR USE ON AIRCRAFT
Filed March 23, 1942  3 Sheets-Sheet 2
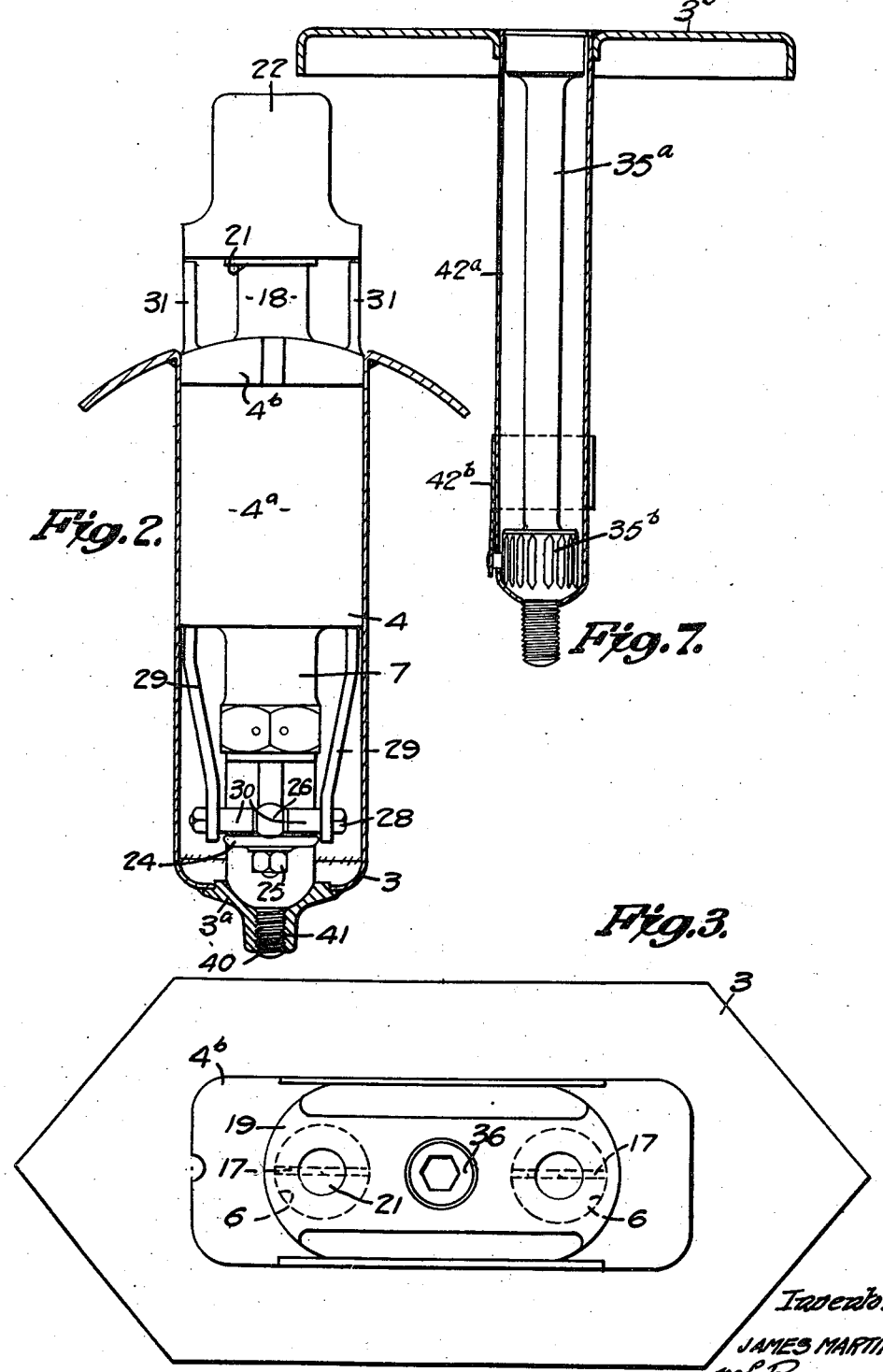

Dec. 7, 1943.  J. MARTIN  2,335,952
CABLE CUTTING DEVICE FOR USE ON AIRCRAFT
Filed March 23, 1942  3 Sheets-Sheet 3

Inventor:
JAMES MARTIN
per Raynor ho
Attorneys.

Patented Dec. 7, 1943

2,335,952

UNITED STATES PATENT OFFICE 2,335,952

CABLE CUTTING DEVICE FOR USE ON AIRCRAFT

James Martin, Higher Denham, near Uxbridge, England

Application March 23, 1942, Serial No. 435,867
In Great Britain April 29, 1940

9 Claims. (Cl. 164—47)

This invention relates to devices for use on aircraft for the purpose of severing barrage cables and other like obstructions, and comprising a cutting device adapted to be carried on the leading edge of a wing or other suitable part of an aeroplane, and embodying a housing with one or more cartridge receiving chambers each containing an axially forwardly displaceable shearing member having a hardened steel leading cutting edge, an abutment in advance of said chambers supporting an anvil member for each shearing member, means to guide between the anvil and each of said chambers the cable or other obstruction to be severed, and percussion firing means with each chamber automatically operable upon impact of the cable or other obstruction with the device to fire the appropriate cartridge, thus projecting the appropriate shearing member against the anvil so that the cable receives the maximum impact of said cutting edge and is severed. Trigger members are actuated to release spring loaded firing pins, a trigger member being displaced by the contact of a cable with it or with a projecting part of the housing.

A preferred arrangement is one in which the whole of the severing device is a self-contained unit which can be inserted in a compartment formed in the aircraft and locked in operative position by the simple operation of rotating a threaded pin or a bolt carried by the said body, and two embodiments of such a device are illustrated by the accompanying drawings in which:

Fig. 2 is a side elevation of Fig. 1, the said compartment being shown in section.

Fig. 3 is a front elevation of Fig. 1.

Fig. 7 is a part sectional elevation of a dummy nose-cap for securing over the opening in the wing when the shearing device is removed from the compartment.

Figure 1:
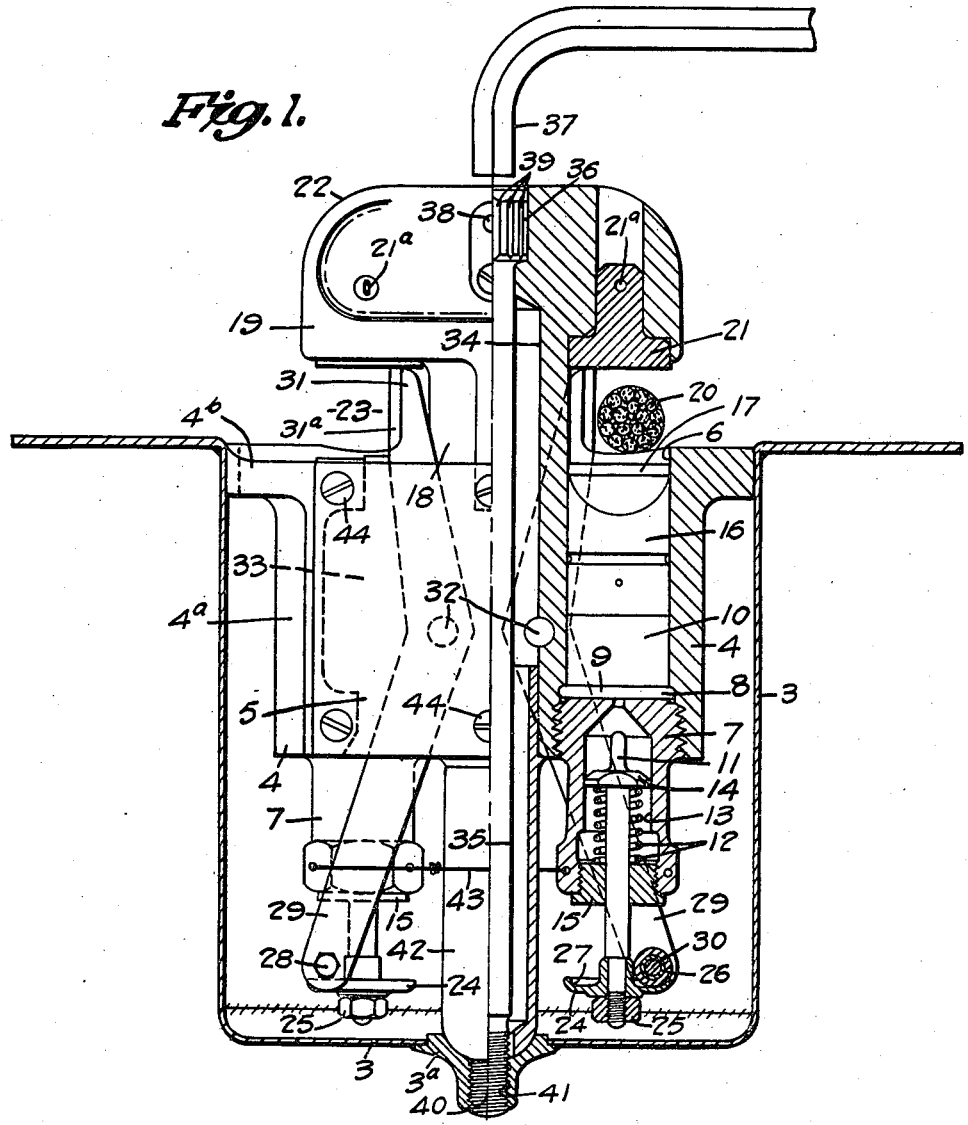
Fig. 1 is a sectional plan view showing a cable shearing device with two cutters, the device being shown accommodated within a compartment formed in the aircraft wing, and half of the device being shown in outside elevation.
Figure 4:
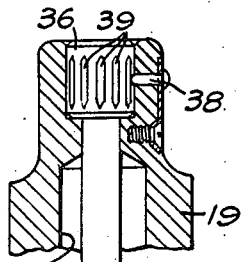
Fig. 4 is a detail sectional plan view of the manipulated end of the member for locking the shearing device in the said compartment.

Referring to the drawings, the wing 1 can be provided at its leading edge with armouring 2 along which at intervals are provided cable cutting devices accommodated within compartments 3, only one such device and compartment being shown. However, if desired instead of mounting the cutting devices on the wings, they may be mounted on suitably shaped light and rigid bar members supported by any suitable framing forward of the wings and propeller or propellers, or cutting devices can be provided on the wings and also on a frame member mounted in front of the propeller or propellers and any other parts likely to be obstructed by the cables or the like.

Each cutting device comprises a main metal body part 4 having attached metal plates 5, and arcuate section side walls 4a which terminate at their front ends in flanges 4b adapted to fit snugly in correspondingly shaped recesses in the mouth of the compartment 3.

The metal body 4 is provided with a symmetrical pair of cylindrical bores comprising cartridge receiving chambers 6 each closed at its rear end by a threaded breech block 7 between each of which and an annular ledge 8 in each chamber 6 is gripped the flange 9 of a percussion fired cartridge 10, the percussion cap of which is struck at the appropriate moment by a firing pin 11 loaded by a strong coiled compression spring 12 in a tubular rear part 13 of each breech block. Each spring 12 is interposed between a flange 14 on the appropriate firing pin and a threaded cap 15 fitted into the end of each tubular part 13.

Fitted as a close sliding fit in the front end of each chamber 6 is a cylindrical plunger-like bullet 16 forming a cutter for which purpose its leading end is tapered to a chisel-like point 17, such point being a hardened steel cutting edge. In practice each cutting edge is intended when a cable is guided opposite it to be forced by the explosion of the appropriate cartridge through the cable against an anvil block located in advance of each cutter, the impact of the cable with part of the housing firing the requisite cartridge. For this purpose the part 4 has at its front end a centrally located neck 18 with a laterally enlarged front end comprising a cutter head 19, the rear faces of this cutter head being spaced in advance of the front end of the housing ample distance to receive a barrage cable 20, such rear faces having plugged therein replaceable anvil members 21 which are secured by split pins 21a. The cutter head has symmetrically rearwardly curved leading corners 22 so that direct impact therewith of a cable will deflect the cable against the armoured leading edge 2 and from thence the cable will slide into the appropriate mouth 23 between an anvil 21 and a cutter 16.

It will be appreciated that the impact of the cable 20 will be laterally towards the neck 18 of the housing, and this impact is relied upon to release the appropriate firing pin 11.

The firing pins are released by a very responsive trigger action which is obtained by providing with each firing pin a flanged head 24 preferably detachably secured by a nut 25 so that it can be adjusted about its axis or readily replaced in the event of it becoming worn by reason of its engagement with a stop member forming part of the trigger mechanism. These two stop members each comprise a roller 26 with spherical periphery engaged in the dished inner face 27 of the flanged head 24 of the appropriate firing pin. Each roller 26 rotates on a bolt 28 bridging the inner ends of a pair of lever arms 29, the bolts 28 carrying distance piece collars 30 to centralise the rollers 26. The two pairs of lever arms 29 form two triggers with exposed front ends 31 projecting across the inner ends of the cable receiving mouths 23 and having outer bevelled edges 31a slightly projecting laterally beyond the upper and lower faces of the neck 18 carrying the head 19. By this means when the complete thickness of a cable enters a mouth 23 it will then engage the appropriate pair of trigger edges 31a and the consequent slight angular movement of the trigger will disengage its roller 26 from the appropriate flange 24 and release the firing pin 11 for operating by its spring 12. Each pair of trigger arms 29 is pivoted on a pin 32 passed through the body 4.

The shearing members 16 will be very firmly plugged into their chambers to prevent unintentional rotation thereof out of the proper shearing position of their chisel edges due to vibration and shocks, but if desired each may be held against such displacement by suitably shaping the flanges 9 of the cartridges and the ledges 8 to ensure correct location of the leading edge of the bullet, it being understood that each plunger-like shearing member 16 is fitted into a cartridge case after the manner of a bullet, any suitable means being provided to ensure correct location of the chisel edge of the plunger member.

The two pairs of lever arms 29 of the triggers are located in four symmetrical shallow spaces 33 opposite sides of the body 4 and normally covered by the plates 5.

The body 4 is readily detachably secured in the compartment 3, for which purpose the centre of the body is bored as at 34 to receive a locking pin or bolt 35 which has a cylindrical head 36 fitted closely in a recess in the centre of the head 19 and having a polygonal or square recess to receive a key 37 for rotating it. A spring loaded locking finger 38 or a spring plunger engages in grooves 39 in the cylindrical head 36 for automatically retaining it in position. The other end of this centre locking pin or bolt 35 is threaded as at 40 to engage in a threaded aperture 41 in the inner end of the compartment 3, this compartment 3 preferably being a light sheet metal construction. The cable cutter is located in the compartment 3 by the sleeve 42 which fits into the bore 34 of the body 4 and has a part spherical end which is clamped firmly into the seating 3a in the base of the compartment 3 by the bolt 35.

In Fig. 7 is shown a dummy nose-cap or cover 3b having a sleeve 42a and securing bolt 35a for clamping it in the opening of the compartment 3 when the cable cutter is removed. A grooved collar 35b and spring catch 42b serve to lock and retain the bolt 35a.

Figure 5:
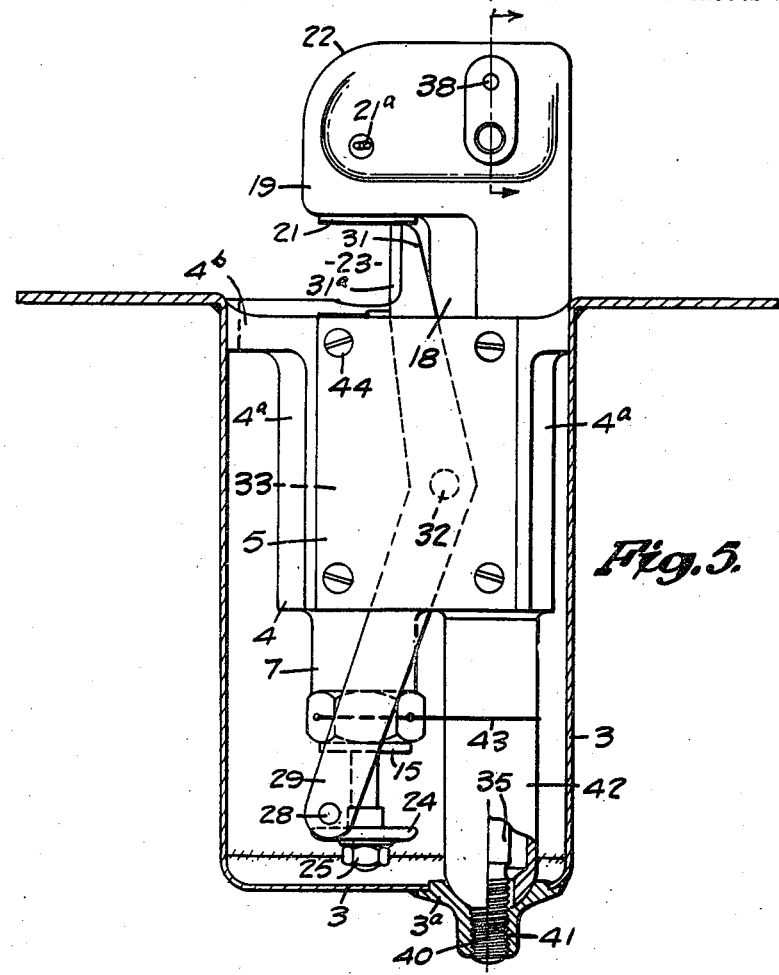
Fig. 5 is a plan view showing a modification in which only one cable cutter is employed.
Figure 6:
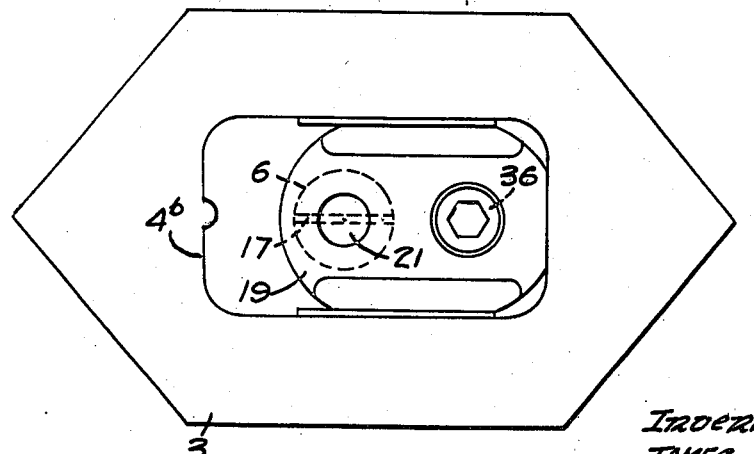
Fig. 6 is a front elevation view of Fig. 5.

The foregoing describes with reference to Figs. 1 to 4 a double arrangement of cable cutters with one body 4 so that a cable coming against either side of the body will be sheared but in some locations on an aircraft or with certain configurations of wings or other parts a duplicated cutter with each body is unnecessary, in which event the smaller device shown in Figs. 5 and 6 can be adopted. In this modification the head 19 and a single cartridge and trigger mechanism receiving part of the body 4 are unilateral in relation to the bored part 34 of the body which received the locking pin or bolt. To ensure correct location of the device in the compartment 3 one of the flanges 4b (and the appropriate recess in the mouth of the compartment 3) is shaped distinctively in relation to the other flange as shown in Figs. 2 and 6. This is desirable with the embodiment shown in Figs. 5 and 6 to avoid the cable cutter facing the wrong direction on the aircraft, and in the device shown in Figs. 1 and 2 to ensure correct alignment of the device with the leading edge or other part of the wing or aircraft.

It will be seen that the heads of the anvils 21 are almost wholly recessed within the head 19 so that they will not spread or split when receiving the impact of the chisel end of the bullet upon a cable being sheared. The breech block or blocks 7 is or are secured by locking wires 43, and the cover plates 5 are detachably secured by screws 44, the whole forming a compact easily handled unit with adequate protection against accidental firing of the cartridges.

I claim:

1. A device for severing barrage cables comprising a metal body adapted to be readily detachably bolted in a fore and aft direction in a leading edge part of an aircraft exposed to contact with a barrage cable, a head projecting from the front end of said body and adapted to receive an anvil, a cutter and cartridge receiving chamber in said body directly in rear of the anvil receiving part of said head, a lever arm pivoted to said body, one end of said arm extending between the said chamber and anvil receiving part of the head and adapted to be operatively engaged by the cable, a roller with a part spherical periphery carried by the other end of said arm, a spring loaded firing pin, a dished flange-like head on said pin normally engaged against said roller to retain the firing pin in the loaded position, a member closing the rear end of said chamber and receiving said firing pin, and a bolt passed through and carried by said body adapted to be manipulated at its front end for threading its rear end into the appropriate part of the aircraft.

2. A device for severing barrage cables comprising a metal body adapted to be fitted in a leading edge part of an aircraft, a T-shaped head projecting beyond the front end of said body to form a pair of lateral cable receiving recesses, anvils fitted in the cross limb of said T-shaped head, a pair of cartridge receiving chambers in said body in axial alignment with said anvils, each adapted to receive a cartridge and a cable cutting member slidable as a close fit in the front ends of said chambers, members closing the rear ends of said chambers, a spring loaded firing pin in each of said closure members, two pairs of trigger levers pivoted to said body and projecting at one end across said recesses, normally engaging abutments on said levers and said firing pins, and means to secure the said body readily detachably to the aircraft.

3. A device for severing barrage cables comprising a metal body adapted to be fitted in a leading edge part of an aircraft, a T-shaped head projecting beyond the front end of said body to form a pair of lateral cable receiving recesses, anvils fitted in the cross limb of said T-shaped head, a pair of cartridge receiving chambers in said body in axial alignment with said anvils, each adapted to receive a cartridge and a cable cutting member slidable as a close fit in the front ends of said chambers, members closing the rear ends of said chambers, a spring loaded firing pin in each of said closure members, rollers with part spherical peripheries supported by said levers, dished flange-like heads on the firing pins normally abutting against said rollers to retain the firing pins in the loaded condition, and means to secure the said body readily detachably to the aircraft.

4. A device for severing barrage cables comprising a metal body adapted to be fitted in a fore and aft direction in an aircraft at a point exposed to contact with a barrage cable, a head projecting from the front end of said body adapted to receive an anvil, a cartridge and cutting tool receiving chamber in said body in axial alignment with the anvil receiving part of said head, a trigger exposed between said head and body to contact with the cable so that it is operated by the cable to be sheared, means to close said chamber at the end remote from said anvil, a percussion operated cartridge firing member in said closure means adapted to be operated by said trigger, and means to secure said body readily detachably in a leading edge part of the aircraft.

5. A device for severing barrage cables comprising a metal body adapted to be fitted in a leading edge part of an aircraft, a T-shaped head projecting beyond the front end of said body to form a pair of lateral cable receiving recesses, anvils fitted in the cross limb of said T-shaped head, a pair of cartridge receiving chambers in said body in axial alignment with said anvils, each adapted to receive a cartridge and a cable cutting member slidable as a close fit in the front ends of said chambers, members closing the rear ends of said chambers, a spring loaded firing pin in each of said closure members, two pairs of trigger levers pivoted to said body and projecting at one end across said recesses, normally engaging abutments on said levers and said firing pins, and means to secure said body readily detachably in a part of the aircraft likely to be exposed to contact with a barrage cable.

6. A device comprising, in combination, a wide mouthed container adapted to fit in a recess in a leading surface of an aircraft with the mouth of the container flush with said surface, a cable-cutting device positioned in said container with a cutting element flush with the mouth thereof, means to removably lock said cutting device in said container, said cutting device comprising a cartridge-receiving chamber, a cartridge having a cutter on the nose thereof, a percussion device positioned at the rear of said cartridge, an abutment extending beyond the mouth of said container and having a recess flush with the mouth of said container and adapted to receive the cable to be cut, an anvil mounted in said recess and positioned to receive the impact of said cutter, a lever having one end extending into said recess and the other end arranged and positioned to actuate said percussion device when a cable passes into said recess.

7. A device as recited in claim 6 in which the cartridge-receiving chamber is provided with a removable breech, said breech accommodating said percussion device.

8. A device as recited in claim 6 in which the removal locking device comprises a bolt which passes from said abutment through the device and is threaded into the base of said container.

9. A device comprising, in combination, a wide mouthed container adapted to fit in a recess in a leading surface of an aircraft with the mouth of the container flush with said surface, a cable-cutting device positioned in said container with a cutting element flush with the mouth thereof, means to removably lock said cutting device in said container, said cutting device comprising a cartridge-receiving chamber, a cartridge having a cutter on the nose thereof; a percussion device positioned at the rear of said cartridge, an abutment extending beyond the mouth of said container and having a recess flush with the mouth of said container and adapted to receive the cable to be cut, an anvil mounted in said recess and positioned to receive the impact of said cutter, a removable breech fitted into the rear of said cartridge-receiving chamber and accommodating said percussion device, a spring actuated firing pin carried by said breech and projecting beyond the rear end of said breech, a lever having one end extending into said recess and the other end positioned to normally contact an abutment on the end of said firing pin whereby when a cable passes into said recess and moves said lever the firing pin will be released for actuating said percussion device.

JAMES MARTIN.